Oct. 4, 1960 A. COUCH 2,954,570
HOLDER FOR PLURAL THREAD CHASING TOOLS INCLUDING
TOOL CLAMPING BLOCK WITH LUBRICATION PASSAGEWAY
Filed Oct. 7, 1957 2 Sheets-Sheet 2

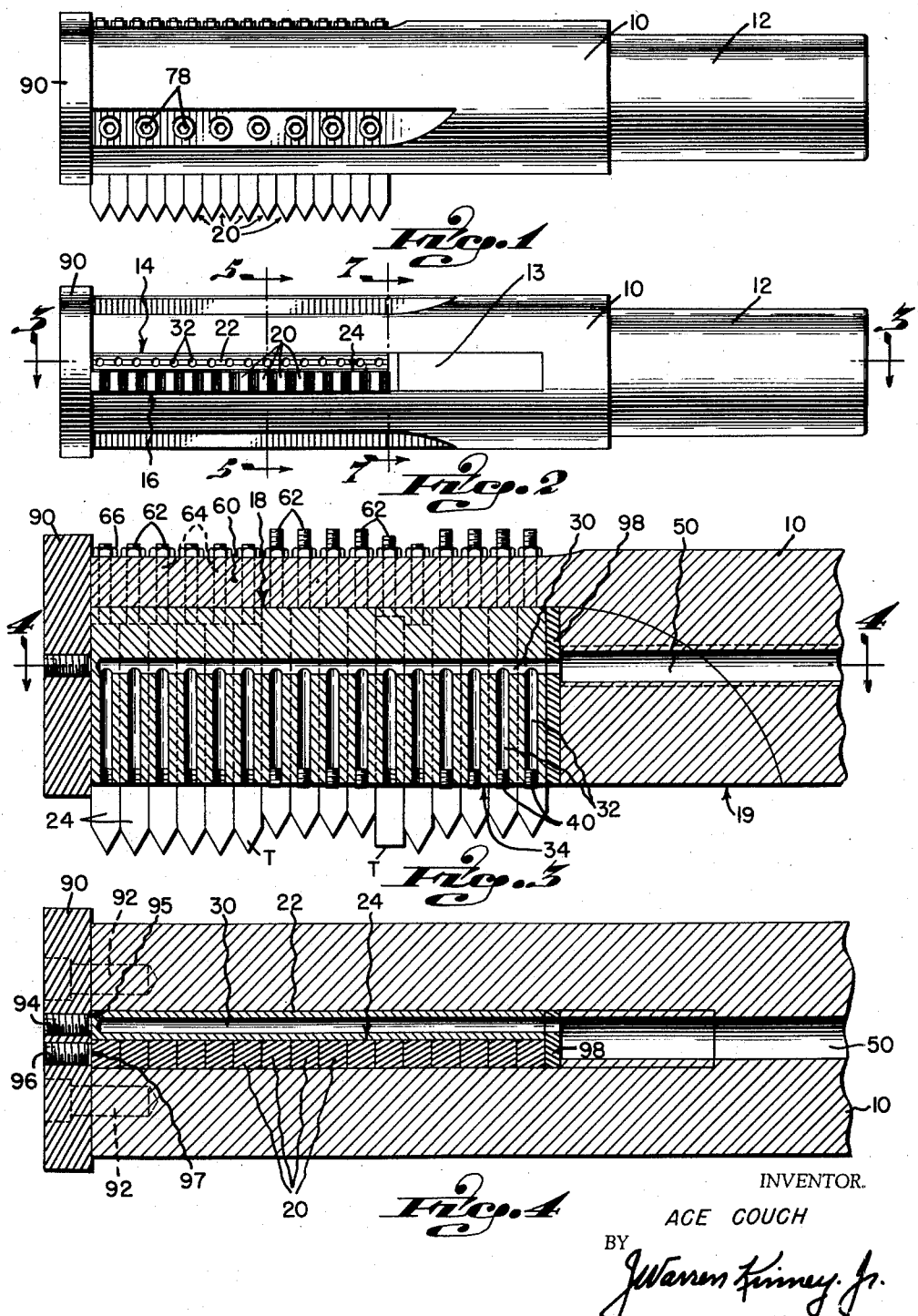

INVENTOR.
ACE COUCH
BY
J. Warren Kinney, Jr.
ATTORNEY

United States Patent Office 2,954,570
Patented Oct. 4, 1960

2,954,570

HOLDER FOR PLURAL THREAD CHASING TOOLS INCLUDING TOOL CLAMPING BLOCK WITH LUBRICATION PASSAGEWAY

Ace Couch, 2297 Colerain Ave., Cincinnati 14, Ohio

Filed Oct. 7, 1957, Ser. No. 688,602

7 Claims. (Cl. 10—106)

This invention relates to a thread chasing tool, and more particularly to a dual-purpose thread chaser, which may be utilized for chasing both internal and external threads on a rotating piece of work.

An object of the invention is to provide a thread chaser tool which includes means for securely though releasably mounting a plurality of thread cutting tools in abutting, side-by-side relationship, and of providing simple yet highly effective means for securing the various cutting tools in adjusted position relative to the workpiece, whereby all or just certain of the cutting tools are operative.

A further object of the invention is to provide a thread chaser tool which not only includes means for accurately mounting a plurality of individual tools, but which also includes means for selectively delivering a stream of cutting fluid directly onto the upper cutting face of all or just certain of the tools.

The invention further contemplates the provision of means for selectively controlling the flow of cutting fluid to the respective tools.

A further object of the invention is to provide a thread chaser tool having the various hereinabove described characteristics, which is constructed in such a manner as to enable the various cutting tools to be mounted on one or the other side of center for enabling the cutter to be utilized in chasing external as well as internal threads.

A further object of the invention is to provide a thread chaser tool which is ruggedly constructed and which is so constructed as to enable the various component elements thereof to be readily manipulated for providing desired adjustment.

These and other objects are attained by the means described herein and as disclosed in the accompanying drawings, in which:

Fig. 1 is a side elevational view of a thread chaser tool embodying the teachings of the present invention.

Fig. 2 is a view similar to Fig. 1, with the tool rotated 90°.

Fig. 3 is a sectional view taken on line 3—3 of Fig. 2.

Fig. 4 is a sectional view taken on line 4—4 of Fig. 3.

Figure 5:
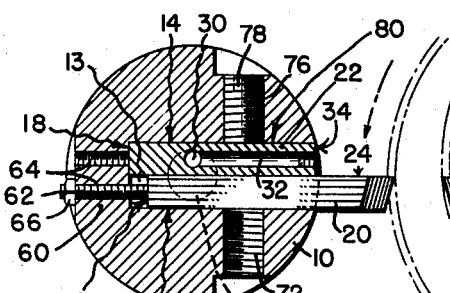
Fig. 5 is a sectional view taken on line 5—5 of Fig. 2, with the cutting tool mounted for cutting external threads.

With reference now to the drawing, the numeral 10 denotes generally the tool holder which comprises an elongate, rigid piece of bar stock having an end 12 adapted to be mounted to a suitable tool holder, not illustrated, since the present invention is neither directed to nor concerned with the structural details of the tool holder.

As best illustrated in Figs. 2 and 3, a slot B is provided in bar 10, said slot including laterally spaced, parallel, transverse walls 14 and 16 and a rear wall 18. Such a slot may be provided by any suitable means such as, by way of example, a milling cutter, or the like.

In the preferred embodiment of the invention, the transverse walls 14 and 16 are disposed equi-distant from the longitudinal axis of bar 10. The overall width of the slot, between walls 14 and 16, is dimensioned whereby to accommodate a cutter tool 20 and a lubricator block 22 wherein the lubricator block 22 is mounted above and in overlying, contacting relationship with upper faces 24 of the cutter tools 20.

The depth of the slot is such as to extend an appreciable distance beyond the axial center of the bar, and uniformly satisfactory results have been obtained in those instances wherein the depth of the slot measured from rear wall 18 to forward edge 19 (Fig. 3) has approximated 75% of the diameter of bar 10.

As best illustrated in Figs. 1 through 4, a plurality of cutting tools 20 are mounted in the slot 13 with adjacent faces in contacting, side-by-side relationship, it being understood that each of the cutting tools will be provided with a suitably formed cutting edge or tip denoted generally by the letter T.

Figure 6:
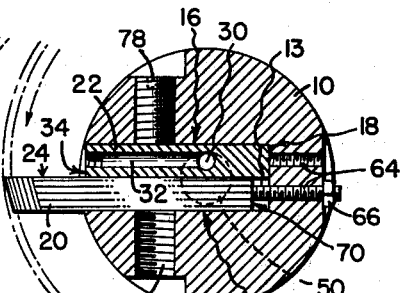
Fig. 6 is a view similar to Fig. 5, with the cutter tool mounted for cutting internal threads.
Figure 7:
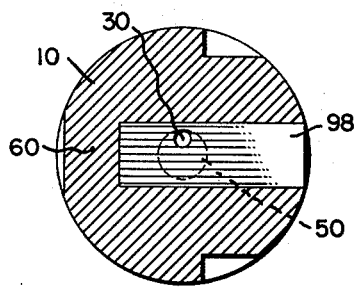
Fig. 7 is a sectional view taken on line 7—7 of Fig. 2.
Figure 8:
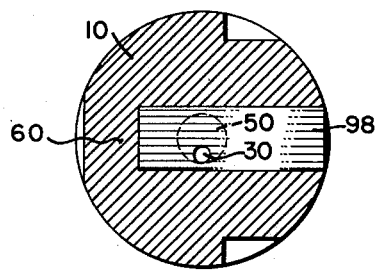
Fig. 8 is a view similar to Fig. 7, showing the relationship of the parts as altered when the cutting tool has been shifted as from Fig. 5 to Fig. 6, for cutting internal threads.

The lubricator block 22 is preferably formed in one piece and is provided with a longitudinally extending passageway 30 from which a plurality of feeder bores 32 extend. As best illustrated in Figs. 3, 5 and 6, each of the feeder bores extends inwardly from the outer forward surface 34 of the lubricator block to passageway 30, said feeder bores 32 being arranged in the block whereby one of such bores will overlie each of the cutter tools 20.

In the preferred embodiment of the invention suitable means are provided for enabling the operator to selectively close the outer ends of the feeder bores, and I have found that such bores may be effectively closed by means of externally threaded plugs 40 which are threadably receivable within the internal threaded ends of the various feeder bores.

The forward end of passageway 30 is closed, whereas the open or rear end thereof is adapted to be aligned with a cutter fluid passageway 50 provided axially of the cutter bar rearwardly of the tool-receptive slot, whereby a continuous source of cutting fluid may be provided, from a suitable source, not illustrated, through the cutter bar 10, thence through the lubricator block 22 and through the feeder bores 32 directly onto the upper surface 24 of the cutter tools.

Means for adjusting the amount by which the various tools project from the slot are provided, said means being secured to and carried by that portion of the bar denoted generally by the numeral 60, which is beyond rear end 18 of the tool receptive slot. The adjustable tool-positioning means may comprise a plurality of externally threaded members 62, each of which threadably engage internally threaded bores 64, each of which is located in axial alignment with the rear end 70 of a cutter tool 20.

In the preferred embodiment of the invention, and as best illustrated in Figs. 5 and 6, the internally threaded bores 64 are located in vertically aligned pairs whereby threaded members 62 may be inserted through portion 60 for engaging the ends of the cutting tools, whether they be mounted for external threading, as in Fig. 5, or for internal threading, as in Fig. 6. Locking means, such as nuts 66, may be secured to and carried by the outer ends of the tool positioning means 62.

From the foregoing, and as best illustrated in Fig. 3, it will be noted that the relative positioning of each of the cutting tools 20 may be accurately and precisely determined by reason of the relationship between tool positioning means 62 and their respective cutter tools.

With reference now to Figs. 5 and 6, it will be noted that in the preferred embodiment of the invention a pair of axially aligned, internally threaded bores 72 and 76 are provided forwardly of the axis through bar 10 and at substantial right angles with transverse walls 14 and 16 of the elongate slot. These internally threaded bores 72 and 76 are adapted to receive an externally threaded lock screw 78, the inner end of which is adapted to bear against surface 80 of the lubricator block, it being noted that lock screws 78 comprise adjustable tool-clamping means which are secured to and carried by that portion of the holder bar 10 which is above that transverse wall of the slot which is adjacent the upper faces 24 of the cutter tools, and which faces the cutting edge of the cutting tool.

The numeral 90 denotes an end plate which is securely though releasably fastened to the forward end of bar 10 by means of a plurality of bolts 92 (Fig. 4). Adjustment bolts 94 and 96 threadably engage the end plate whereby to exert an endwise force against the forward face 95 of the lubricator block 22 and forward face 97 of the foremost of the tools 20, for forcing the lubricator block and tools 20, respectively, to the right in slot 20 into firm abutting relationship with a shim 98 at the end of slot 12.

In this manner I have provided a simple yet highly effective means for positively positioning the lubricator block and tools in the center bar 10.

Figure 9:
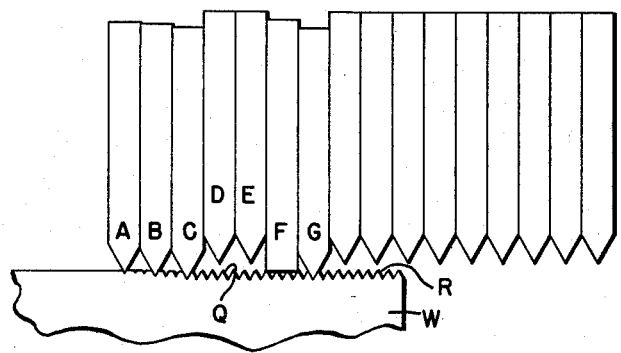
Fig. 9 is a diagrammatic view illustrating a method of using the subject tool.

With particular reference now to Fig. 9, I have diagrammatically illustrated an exemplary set-up obtainable with my unique thread chasing tool, wherein the letters A, B and C represent three roughing cutters which are set to engage workpiece W for providing rough threads Q. Cutters D and E have been retracted to non-operative position whereas cutter F has been positioned to remove any burrs and determine the maximum height of the tooth being formed in the workpiece W. Tool G has been set to provide a finish cut to the threads, thereby completing, with one pass of the tool, completed threads R. The other cutting tools have been retracted to non-operative position in the example just given, however it should be clearly understood that in some operations all of said tools may be positioned whereby to be operative. One of the advantages of my tool is its great versatility in the sense that it may be used to chase either internal or external threads by merely shifting the bank of cutting tools and the lubricator block to opposite sides of a center through bar 10, as best illustrated in Figs. 5 and 6. My tool likewise permits an adequate supply of cutting fluid to be applied directly to the cutting surface of those cutters of the bank of cutters which are in actual use, viz., A, B, C, F and G of Fig. 9.

What is claimed is:

1. A cutting tool comprising, in combination, an elongate bar having an elongate slot in one side thereof at its forward end, a plurality of individual cutting tools, a lubrication block, said tools and block seated in said slot with the tools in abutting, side-by-side relationship and with the lubricator block extending across and spanning the upper surfaces of each of said tools, fluid conducting means in said block for directing an individual stream of cutting-fluid onto the upper surface of each of said tools, means engaging said bar for fixedly securing the tools and block to said bar, said bar including means on opposite sides of said slot for selectively mounting said last-mentioned engaging means, and a cutting-fluid passageway in said bar engageable by said block, said passageway being so dimensioned as to be in open communication with said fluid conducting means in the lubricator block in either of the selected positions of the lubricator block.

2. A cutting tool comprising, in combination, an elongate bar having an elongate slot in one side thereof at its forward end, said slot including laterally spaced, parallel, transverse walls, an end and a rear wall, a plurality of individual cutting tools, a lubricator block, said tools and block seated in said slot with the tools in abutting side-by-side relationship and with the lubricator block extending across and spanning the upper surface of each of said tools, adjustable tool-clamping means engaging the lubricator block for forcing it against the upper surfaces of said tools, said means secured to and carried by that portion of the bar which is above that transverse wall of the slot remote from said cutting tools, said bar including means on opposite sides of said slot for selectively mounting said tool clamping means, adjustable tool-positioning means individually engaging each of said cutting tools, said last mentioned means secured to and carried by that portion of the bar rearwardly of the rear wall of said slot, said block including an axial passageway and a plurality of feeder bores in open communication with and extending at right angles therefrom with one such feeder bore provided for each of said individual cutting tools, and a passageway in said bar and being so dimensioned as to be in open communication with the axial passageway of the lubricator block, in either of the selected positions of the lubricator block.

3. A dual purpose tool adapted for external and internal cutting operations comprising, in combination, an elongate bar having an elongate slot in one side thereof at its forward end, said slot including laterally spaced, parallel, transverse walls, an end and a rear wall, a plurality of individual cutting tools, a lubricator block, said tools and block seated in said slot with the tools in abutting side-by-side relationship and with the lubricator block extending across and spanning the upper surface of each of said tools, adjustable tool-clamping means engaging the lubricator block for forcing it against the upper surfaces of said tools, a plurality of internally-threaded bores extending through the bar on opposite sides of the slot, said tool-clamping means receivable in the bores on one or the other sides of said slot, whichever are remote from the cutting tools being clamped, adjustable tool-positioning means individually engaging each of said cutting tools, two sets of vertically aligned internally threaded bores extending through that portion of the holder rearwardly of the rear wall of said slot, wherein the bores of one set are aligned with the rear end of each of the cutting tools when seated in the slot for external cutting, and wherein the bores of the other set are aligned with the rear end of each of the cutting tools when seated in the slot for internal cutting, said tool-adjusting means receivable in one or the other of said sets of bores, said lubricator block including an axial closed ended passageway and a plurality of feeder bores in open communication with and extending at right angles therefrom with one such feeder bore provided for each of said individual cutting tools, and a passageway in said bar and being so dimensioned as to be in open communication with the axial passageway of the lubricator block in either of the selected positions of the lubricator block.

4. A cutting tool comprising, in combination, an elongate bar having an elongate slot in one side thereof at its forward end, said slot including laterally spaced, parallel, transverse walls, an end and a rear wall, a plurality of individual cutting tools, a lubricator block, said tools and block seated in said slot with the tools in abutting side-by-side relationship and with the lubricator block extending across and spanning the upper surface of each of said tools, adjustable tool-clamping means engaging the lubricator block for forcing it against the upper surfaces of said tools for forcing them against a transverse wall of said slot, said bar including means on opposite sides of said slot for selectively mounting said tool clamping means, adjustable tool-positioning means individually engaging an end of each of said cutting tools, said lubricator block including an axial passageway closed at one end and a plurality of feeder bores in open communication with and extending at right angles therefrom with one feeder bore for each of said individual cutting tools, each of said feeder bores terminating in an orifice positioned above one of said tools externally of said slot, and means in said bar supplying a flow of fluid to said lubricator bar, said last-mentioned means being so dimensioned as to be in open communication with said axial passageway of the lubricator block in either of the selected positions of the lubricator block.

5. A cutting tool comprising, in combination, an elongate bar having an elongate slot in one side thereof at its forward end, a plurality of individual cutting tools, a lubrication block, said tools and block seated in said slot with the tools in abutting, side-by-side relationship and with the lubricator block extending across and spanning the upper surfaces of each of said tools, fluid conducting means in said block for directing an individual stream of cutting-fluid onto the upper surface of each of said tools, means engaging said bar for fixedly securing the tools and block to said bar, said bar including means on opposite sides of said slot for selectively mounting said last-mentioned engaging means, a cutting-fluid passageway in said bar engageable by said block, and means engageable with said lubricator block for blocking off one or more of the individual streams of cutting-fluid, said passageway in the bar being so dimensioned as to be in open communication with the fluid conducting means of the lubrication block in either of the selected positions of the lubrication block.

6. A cutting tool comprising, in combination, an elongate bar having an elongate slot in one side thereof at its forward end, said slot including laterally spaced, parallel, transverse walls, an end and a rear wall, a plurality of individual cutting tools, a lubricator block, said tools and block seated in said slot with the tools in abutting side-by-side relationship engaging the end, rear and one of the transverse walls, and with the lubricator block extending across and spanning the upper surface of each of said tools and engaging the end, rear and the other of said transverse walls, adjustable tool-clamping means engaging the lubricator block for forcing it against the upper surfaces of said tools, said means secured to and carried by that portion of the bar which is above that transverse wall engaged by said block, said bar including means on opposite sides of said slot for selectively mounting said tool clamping means, adjustable tool-positioning means individually engaging each of said cutting tools, said last mentioned means secured to and carried by that portion of the bar rearwardly of the rear wall of said slot, said lubricator block including an axial passageway closed at its forward end and a plurality of feeder bores in open communication with and extending at right angles from said passageway with one such feeder bore provided for each of said individual cutting tools, and a passageway in said bar and being so dimensioned as to be in open communication with the axial passageway of the lubricator block, in either of the selected positions of the lubricator block.

7. In combination with the tool described in claim 6, an end plate engageable with that end of the elongate bar in which the slot is located, means securing said end plate to the end of said bar, and means engaging said bar urging said tools and lubricator block toward and in abutting relationship with the end wall of the slot.

References Cited in the file of this patent
UNITED STATES PATENTS

| | | |
|---|---|---|
| 2,289,155 | Weidauer | July 7, 1942 |
| 2,669,149 | Watson | Feb. 16, 1954 |
| 2,789,641 | Solenberger | Apr. 23, 1957 |